United States Patent
Park et al.

(10) Patent No.: US 12,315,265 B2
(45) Date of Patent: May 27, 2025

(54) METHOD AND APPARATUS WITH ESTIMATION OF DISTANCE BETWEEN PEDESTRIAN AND CAMERA

(71) Applicant: Samsung Electronics Co., Ltd., Suwon-si (KR)

(72) Inventors: Yonggonjong Park, Suwon-si (KR); Cheolhun Jang, Pohang-si (KR); Dae Hyun Ji, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 17/518,762

(22) Filed: Nov. 4, 2021

(65) Prior Publication Data

US 2022/0366177 A1 Nov. 17, 2022

(30) Foreign Application Priority Data

May 13, 2021 (KR) .................. 10-2021-0061827

(51) Int. Cl.
*G06V 20/58* (2022.01)
*G01B 11/02* (2006.01)
*G06T 7/215* (2017.01)
*G06T 7/70* (2017.01)

(52) U.S. Cl.
CPC ............ *G06V 20/58* (2022.01); *G01B 11/026* (2013.01); *G06T 7/215* (2017.01); *G06T 7/70* (2017.01); *G06T 2207/30261* (2013.01)

(58) Field of Classification Search
CPC ........ G01B 11/026; G06T 2207/30261; G06T 7/215; G06T 7/70; G06T 2207/30196; G06T 7/55; G06T 7/60; G06T 7/251; G06T 7/344; G06T 2207/10028; G06V 20/58; G06V 10/809; G06V 40/10
See application file for complete search history.

(56) References Cited

U.S. PATENT DOCUMENTS

| | | | |
|---|---|---|---|
| 9,254,846 B2 | 2/2016 | Dolgov et al. | |
| 10,008,002 B2 | 6/2018 | Lalonde et al. | |
| 10,318,826 B2 * | 6/2019 | Zhang | G06V 20/58 |

(Continued)

FOREIGN PATENT DOCUMENTS

| | | |
|---|---|---|
| JP | 5829155 B2 | 12/2015 |
| JP | 2018-179911 A | 11/2018 |
| JP | 2019-11971 A | 1/2019 |

(Continued)

OTHER PUBLICATIONS

Dolatabadi et al., "Multiple-Joint Pedestrian Tracking Using Periodic Models" Sensors 2020, 20, 6917; doi:10.3390/s20236917 Examiner Note: Estimates distance of a pedestrian (ankle, knee) to vehicle or camera (Year: 2020).*

(Continued)

*Primary Examiner* — James M Pontius
(74) *Attorney, Agent, or Firm* — NSIP Law

(57) ABSTRACT

A method with distance estimation includes detecting a pedestrian region of a pedestrian comprised in a plurality of images received from a camera; determining a static point in the detected pedestrian region; and determining a distance between the pedestrian and the camera based on the static point in each of the images and a position of the camera corresponding to each of the images.

15 Claims, 5 Drawing Sheets

(56) References Cited

U.S. PATENT DOCUMENTS

| | | | |
|---|---|---|---|
| 2013/0176425 A1* | 7/2013 | Lerner | H04N 21/8153 348/135 |
| 2018/0164439 A1 | 6/2018 | Droz et al. | |

FOREIGN PATENT DOCUMENTS

| | | | | |
|---|---|---|---|---|
| JP | 2019-96027 A | 6/2019 | | |
| JP | 2019-133324 A | 8/2019 | | |
| KR | 10-1684095 B1 | 12/2016 | | |
| KR | 10-1849373 B1 | 4/2018 | | |
| KR | 10-2020-0017917 A | 2/2020 | | |
| WO | WO-2020245654 A1 * | 12/2020 | | B60W 30/0953 |

OTHER PUBLICATIONS

Ali, Ahmed et al. "Real-time vehicle distance estimation using single view geometry" *Proceedings of the IEEE/CVF Winter Conference on Applications of Computer Vision. 2020.* pp. 1111-1120.
Young-Hak, Kim "Stereo Vision—Challenges and Opportunities in ADAS Applications" https://www.elec4.co.kr/article/article View asp?idx=15526 Oct. 7, 2016 (12 pages in Korean).

\* cited by examiner

METHOD AND APPARATUS WITH ESTIMATION OF DISTANCE BETWEEN PEDESTRIAN AND CAMERA

CROSS-REFERENCE TO RELATED APPLICATIONS

This application claims the benefit under 35 USC § 119(a) of Korean Patent Application No. 10-2021-0061827 filed on May 13, 2021, in the Korean Intellectual Property Office, the entire disclosure of which is incorporated herein by reference for all purposes.

BACKGROUND

1. Field

The following description relates to a method and apparatus with estimation of a distance between a pedestrian and a camera.

2. Description of Related Art

For autonomous driving (AD), a means of transportation such as a vehicle may have limited resources of processors or storage, and it may thus need to reduce complexity of operations and increase efficiency to process data in real time in the means of transportation.

A technology for recognizing a pedestrian may calculate a distance from a floor line of a region where a pedestrian is detected, using camera projection geometry. However, in this case, a position of the pedestrian may not be accurately estimated when a camera is tilted or the ground where the pedestrian is positioned is sloped.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with distance estimation includes: detecting a pedestrian region of a pedestrian comprised in a plurality of images received from a camera; determining a static point in the detected pedestrian region; and determining a distance between the pedestrian and the camera based on the static point in each of the images and a position of the camera corresponding to each of the images.

The static point may correspond to a position of a stepping foot of the pedestrian.

The determining of the static point may include extracting a joint region of the pedestrian from the pedestrian region and determining the static point of the pedestrian based on the extracted joint region.

The determining of the static point may include determining, to be the static point, a point corresponding to a position of a stepping foot of the pedestrian in the joint region.

The determining of the static point may include determining, to be the static point, a point at which a height is lowest in the joint region.

The determining of the distance between the pedestrian and the camera may include determining the distance between the pedestrian and the camera based on a difference between three-dimensional (3D) points determined by a vector comprising the static point in each of the images and a point corresponding to a position of the camera.

In another general aspect, one or more embodiments include a non-transitory computer-readable storage medium storing instructions that, when executed by a processor, configure the processor to perform any one, any combination, or all operations and methods described herein.

In another general aspect, an apparatus with distance estimation includes: a processor configured to: detect a pedestrian region of a pedestrian comprised in a plurality of images received from a camera; determine a static point in the detected pedestrian region; and determine a distance between the pedestrian and the camera based on the static point in each of the images and a position of the camera corresponding to each of the images.

The static point may correspond to a position of a stepping foot of the pedestrian.

For the determining of the static point, the processor may be configured to extract a joint region of the pedestrian from the pedestrian region and determine a static point of the pedestrian based on the joint region.

For the determining of the static point, the processor may be configured to determine, to be the static point, a point corresponding to a position of a stepping foot of the pedestrian in the joint region.

For the determining of the static point, the processor may be configured to determine, to be the static point, a point at which a height is lowest in the joint region.

For the determining of the distance between the pedestrian and the camera, the processor may be configured to determine the distance between the pedestrian and the camera based on a difference between three-dimensional (3D) points determined by a vector comprising the static point in each of the images and a point corresponding to a position of the camera.

The apparatus may include the camera, wherein the camera may be configured to collect the images.

In another general aspect, a method with distance estimation includes: determining a static point of a target in each of images obtained by a camera at different positions; and determining a distance between the target and the camera based on the static point in each of the images and the positions.

For each of the images, the determining of the static point may include determining a joint region of the target and determining the static point based on the joint region.

For each of the images, the determining of the static point may include determining, to be the static point, a lowest point among points in the joint region.

The camera may obtain the images at the different positions by a movement of the camera, and the determining of the distance between the target and the camera may include: determining a structure from motion (SFM) based on the static point in each of the images and the different positions corresponding to the images; and determining the distance based on the SFM.

Other features and aspects will be apparent from the following detailed description, the drawings, and the claims.

Figure 1:
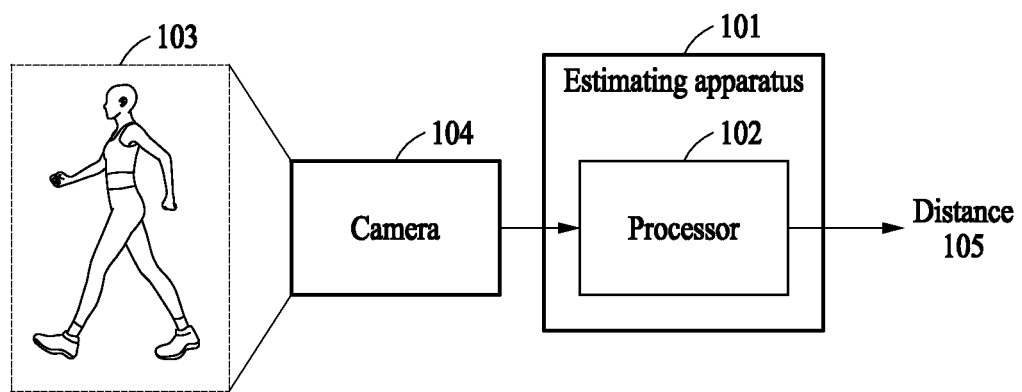
FIG. 1 illustrates an example of an estimating apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of an estimating apparatus.

Referring to FIG. 1, an estimating apparatus 101 may include a processor 102 (e.g., one or more processors). The processor 102 may estimate a distance 105 between a pedestrian and a camera 104. For example, the estimating apparatus 101 may be connected to the camera 104 through a wire or wirelessly. The camera 104 may collect images. The estimating apparatus 101 of one or more embodiments may accurately estimate a distance between a pedestrian and a camera through a plurality of images, irrespective of slope or camera angle. For example, the estimating apparatus 101 of one or more embodiments may accurately estimate a distance between a pedestrian and a camera irrespective of a slope of the ground using a point at which a stepping foot of the pedestrian is fixed for a preset period of time when the pedestrian moves.

The camera 104 may be included in a means of transportation (for example, a vehicle, a drone, a bicycle, and the like, to collect images of an environment around the means of transportation). For example, the camera 104 may collect an image including a pedestrian. In this example, the estimating apparatus 101 may estimate the distance 105 between the pedestrian and the camera 104 using the image collected or received from the camera 104. In one or more non-limiting examples, the estimating apparatus 101 may include the camera 104.

In one example, the estimating apparatus 101 may detect a pedestrian region 103 included in a plurality of images received from the camera 104, determine a static point in the pedestrian region 103, and determine the distance 105 between a pedestrian and the camera 104 based on the static point in each of the images and a position of the camera 104 corresponding to each of the images.

A static point used herein may refer to a fixed point in a pedestrian region included in a plurality of images. That is, the static point may be a point where its position rarely changes in each of the images corresponding to different time points. For example, the static point may be a point corresponding to a position of a stepping foot of a pedestrian.

When a pedestrian moves, their stepping foot may be fixed for a period of time. In one example, based on this, the estimating apparatus 101 may accurately estimate the distance 105 between the pedestrian and the camera 104 irrespective of a slope of the ground using a point at which the stepping foot is fixed for a period of time.

For example, a structure from motion (SFM) may be used to determine the distance 105 between the pedestrian and the camera 104. The SFM may refer to a technology for estimating depth information by matching a moving camera and an object, and may be used to extract three-dimensional (3D) information from a stationary object.

A plurality of images used herein may be images collected by the camera 104 for a period of time during which a stepping foot is fixed. In one example, the estimating apparatus 101 may determine a static point corresponding to a stepping foot in a plurality of images collected for a period of time during which the stepping foot is fixed when a pedestrian moves and may estimate the distance 105 between the pedestrian and the camera 104 based on the static point.

The estimating apparatus 101 may determine the static point corresponding to the stepping foot in the images collected for the period during which the stepping foot is fixed when the pedestrian moves and may estimate the distance 105 between the pedestrian and the camera 104 based on the determined static point.

The estimating apparatus 101 may calculate an SFM based on the static point in each of the images and a position of the camera 104 corresponding to each of the images and estimate the distance 105 between the pedestrian and the camera 104.

That is, using a point at which the stepping foot of the pedestrian is fixed for a period of time when the pedestrian moves, the estimating apparatus 101 may accurately estimate the distance 105 between the pedestrian and the camera 104 irrespective of a slope of the ground. Various example embodiments described herein may be applicable to various fields including, for example, autonomous driving (AD) of a means of transportation (e.g., a vehicle), augmented reality (AR), and the like.

Figure 2:
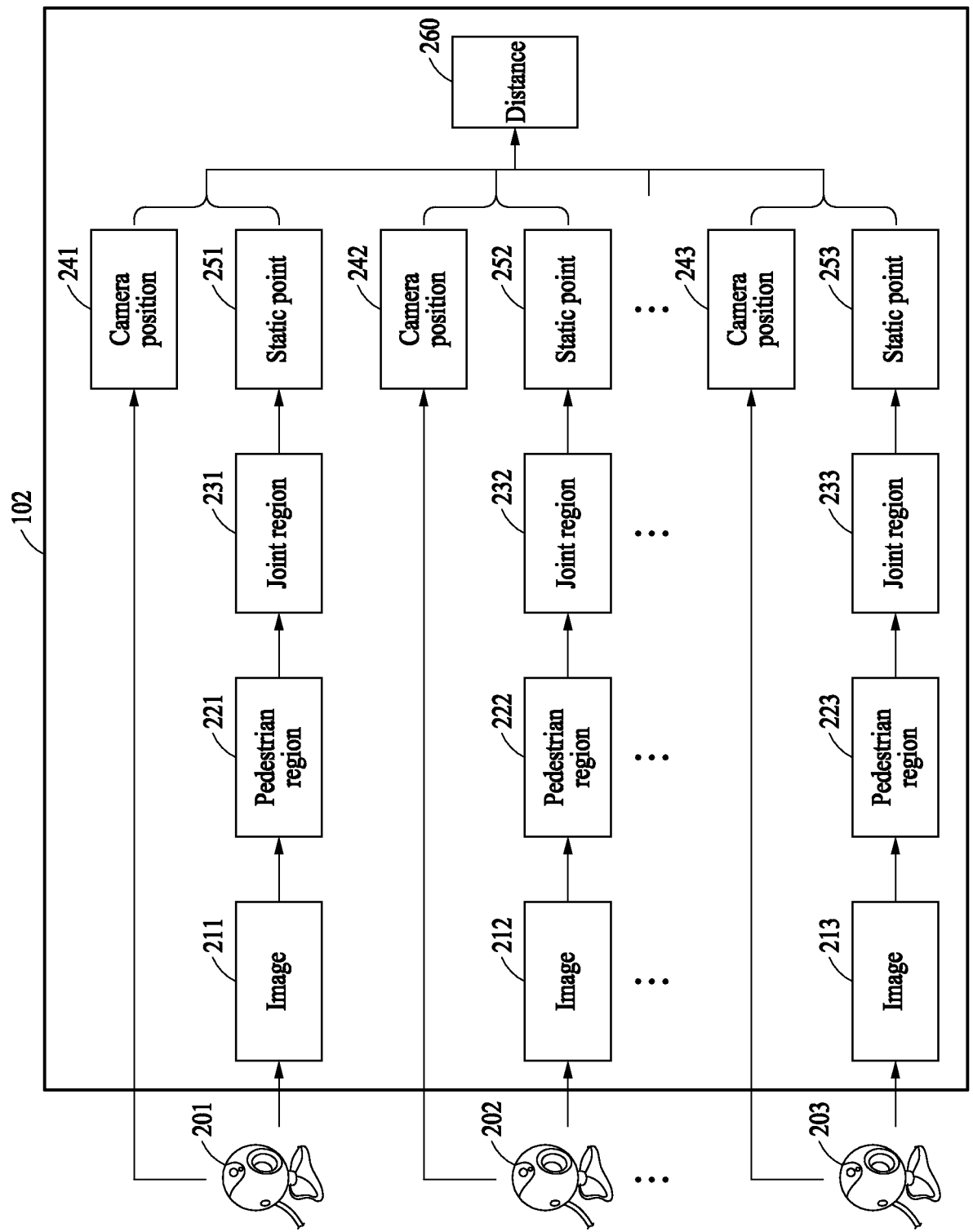
FIG. 2 illustrates an example of processing data by a processor.

FIG. 2 illustrates an example of processing data by a processor.

The processor 102 may receive, from camera 201 through 203, a plurality of images 211 through 213 of different positions 241 through 243. In one or more non-limiting examples, the images 211 through 213 may be sequential image frames of a video. The processor 102 may detect pedestrian regions 221 through 223 included respectively in the images 211 through 213. For example, the images 211 through 213 may be images collected while a pedestrian is moving a step forward. In one or more non-limiting examples, the camera 201 through 203 may be a single camera configured to collect the images 211 through 213 at the the different positions 241 through 243 by a movement of the camera. In one or more other non-limiting examples, the camera 201 through 203 may include a camera 201 located at a camera position 241, a camera 202 located at a camera position 242, and a camera 203 located at a camera position 243.

The pedestrian regions 221 through 223 may indicate regions corresponding to a pedestrian in the images 211 through 213. The pedestrian regions 221 through 223 may be minimum regions including the pedestrian in the images 211 through 213.

An object detection technology, or a technology for detecting the pedestrian regions 221 through 223 described herein, may not be limited to a certain one, and other object detection or recognition technologies that are used by one of ordinary skill in the art after an understanding of the present disclosure may also be used. For example, a deep learning-based object recognition technology may be used. The processor 102 may recognize, as a pedestrian, a person identified through the object recognition technology.

The processor 102 may determine static points 251 through 253 in the detected pedestrian regions 221 through 223. The processor 102 may extract joint regions 231 through 233 of the pedestrian and determine the static points 251 through 253 of the pedestrian based on the extracted joint regions 231 through 233.

For example, to extract the joint regions 231 through 233 of the pedestrian, a human joint detection technology and a pose estimation technology may be used. Non-limiting examples of the estimated joint regions 231 through 233 will be described hereinafter with reference to FIG. 4.

The processor 102 may determine, to be the static points 251 through 253, points respectively corresponding to the positions of a stepping foot of the pedestrian in the joint regions 231 through 233. The processor 102 may determine a point at which a height is lowest in each of the joint regions 231 through 233 to be each of the static points 251 through 253. The stepping foot may refer to a foot that supports the ground when the pedestrian is moving, and thus may correspond to the point at which the height is lowest in each of the joint regions 231 through 233.

The processor 102 may extract the joint regions 231 through 233 from the pedestrian regions 221 through 223 and determine, to be the static points 251 through 253, the points at which the height is lowest in the joint regions 231 through 233.

Even when the pedestrian stops moving, the processor 102 may determine the points at which the height is lowest in the joint regions 231 through 233 to be the static points 251 through 253.

The processor 102 may determine a distance 260 between the pedestrian and the camera 201 through 203 based on the static points 251 through 253 in the images 211 through 213 and the positions 241 through 243 of the camera 201 through 203 respectively corresponding to the images 211 through 213. The processor 102 may calculate the distance 260 between the pedestrian and the camera 201 through 203 based on a difference between 3D points determined by a vector including the static points 251 through 253 in the images 211 through 213 and points corresponding to the positions 241 through 243 of the camera 201 through 203.

An SFM may be used to calculate the distance 260 between the pedestrian and the camera 201 through 203. For example, the 3D points may be determined by the vector including the static points 251 through 253 in the images 211 through 213 and the points corresponding to the positions 241 through 243 of the camera 201 through 203. Based on the difference between the 3D points determined in the images 211 through 213, 3D coordinates of each of the static points 251 through 253 may be determined. Hereinafter, a non-limiting example of the SFM will be described in detail with reference to FIG. 3.

Figure 3:
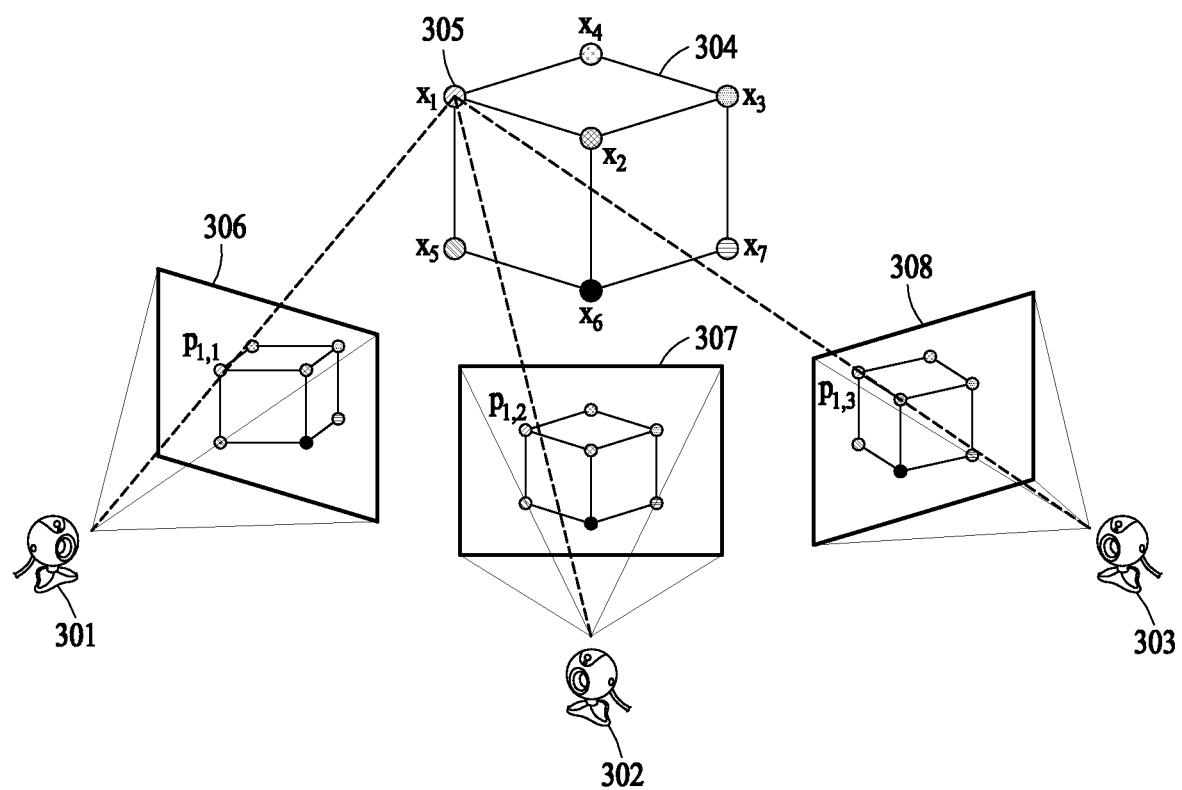
FIG. 3 illustrates an example of a structure from motion (SFM).

FIG. 3 illustrates an example of an SFM.

Referring to FIG. 3, by a camera movement, images 306 through 308 may be collected from the camera at different positions 301 through 303. The images 306 through 308 of the different positions 301 through 303 may be used to estimate a distance between a point $x_1$ 305 on a stationary object 304 and the camera at the positions 301 through 303.

For example, $p_{1,1}$ may be determined as a static point in the image 306 collected by the camera at the position 301. A 3D point determined by a vector including a point corresponding to the position 301 of the camera and the static point $p_{1,1}$ may be a 3D point adjacent to $x_1$.

In this example, $p_{1,2}$ may be determined as a static point in the image 307 collected by the camera at the position 302. A 3D point determined by a vector including a point corresponding to the position 302 of the camera and the static point $p_{1,2}$ may be a 3D point adjacent to $x_1$.

In this example, $p_{1,3}$ may be determined as a static point in the image 308 collected by the camera at the position 303. A 3D point determined by a vector including a point corresponding to the position 303 of the camera and the static point $p_{1,3}$ may be a 3D point adjacent to $x_1$.

For example, an estimating apparatus may determine a distance between the camera and the point $x_1$ 305 on the stationary object 304 based on a difference between 3D points determined in the images 306 through 308 corresponding to the different positions 301 through 303 of the camera. The estimating apparatus may determine the distance between the camera and $x_1$ by applying an SFM to the 3D points determined in the images 306 through 308 corresponding to the different positions 301 through 303 of the camera.

Figure 4:
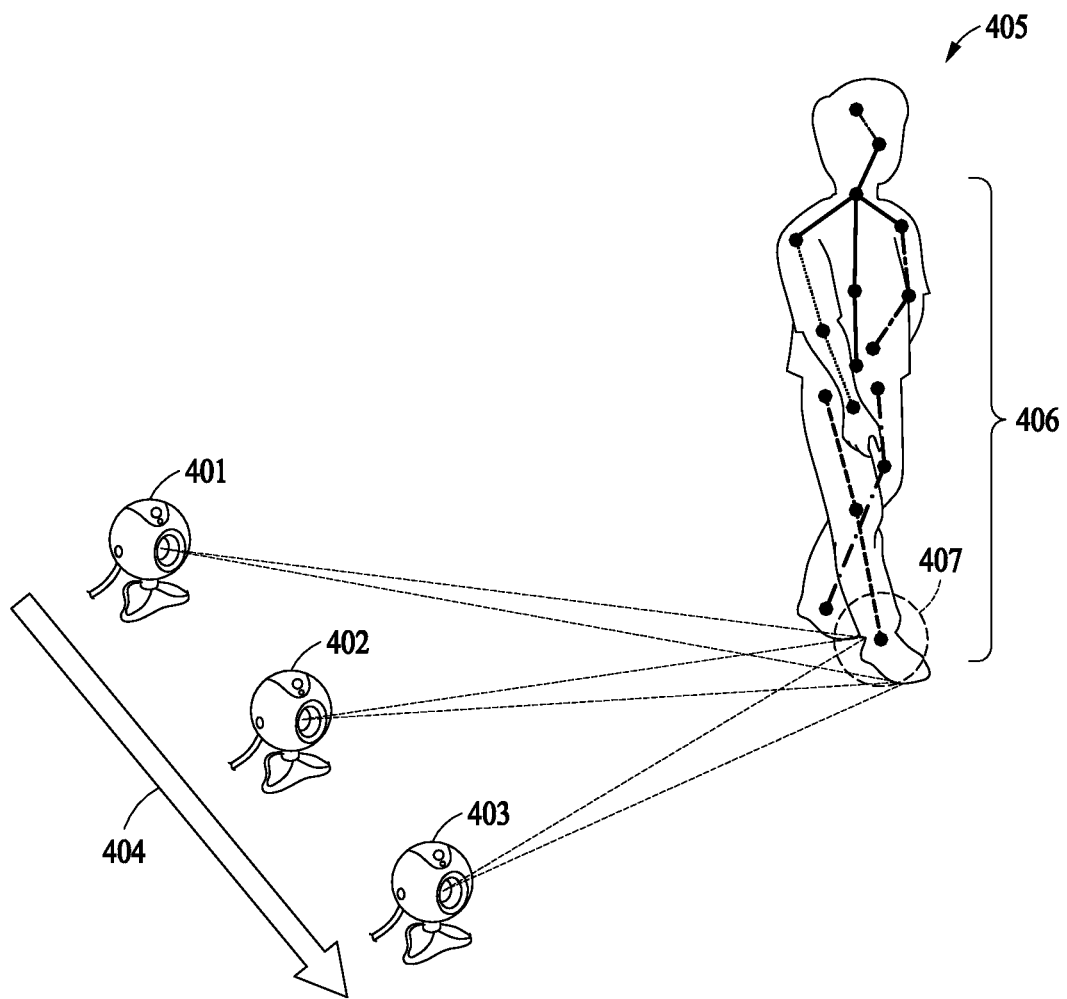
FIG. 4 illustrates an example of a relationship between a moving camera and a static point.

FIG. 4 illustrates an example of a relationship between a moving camera and a static point.

Referring to FIG. 4, a plurality of images associated with a same pedestrian 405 may be collected as a camera moving in a particular direction 404 to different positions 401 through 403. An estimating apparatus may detect a pedestrian region of the pedestrian 405 in each of the images.

The estimating apparatus may determine a static point 407 in the pedestrian region. The estimating apparatus may detect the pedestrian region in each of the images corresponding to the pedestrian 405. The estimating apparatus may extract a joint region 406 of the pedestrian 405 from the pedestrian region. To extract the joint region 406, human joint detection and pose estimation may be used.

The estimating apparatus may determine the static point 407 corresponding to a stepping foot of the pedestrian 405 based on the joint region 406. For example, the estimating apparatus may determine, to be the static point 407, a point at which a height is lowest in the joint region 406. That is, the estimating apparatus may determine, to be the static point 407, a point nearest to the ground in the joint region 406.

In one example, the estimating apparatus may accurately estimate a position of a stepping foot of a pedestrian by performing an SFM on a static point in each of a plurality of images (e.g., three or more images). While a typical estimating apparatus may not accurately estimate a distance by estimating a position of a moving foot, the estimating apparatus of one or more embodiments may accurately estimate a distance to an actual stepping foot by estimating a position of the stepping foot as a static point.

Figure 5:
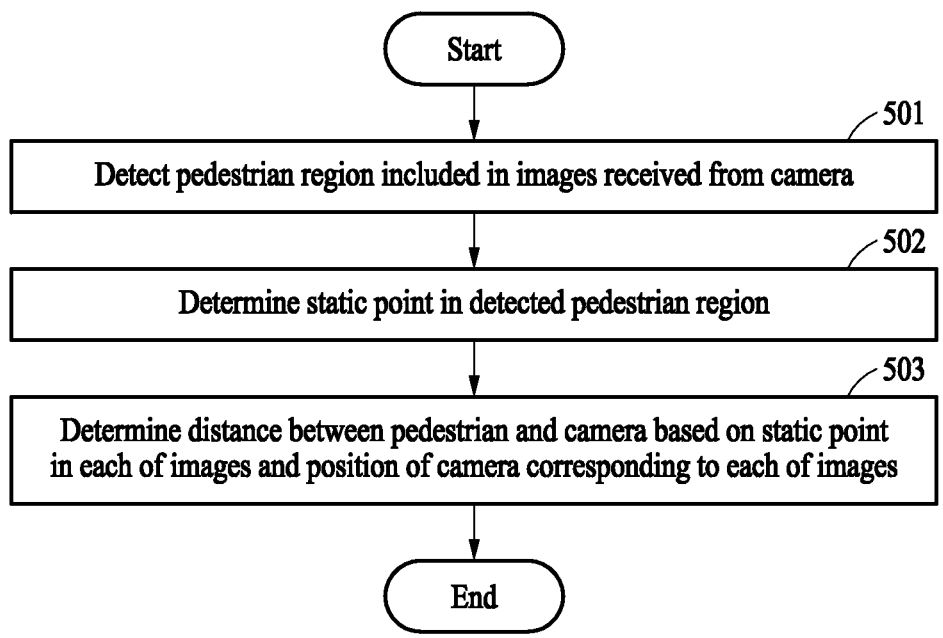
FIG. 5 illustrates an example of estimating a distance between a pedestrian and a camera.

FIG. 5 illustrates an example of estimating a distance between a pedestrian and a camera.

In operation 501, a processor may detect a pedestrian region included in a plurality of images received from a camera. The pedestrian region may refer to a region corresponding to a pedestrian in an image. The pedestrian region may be a minimum region including the pedestrian in the image.

A technology for detecting the pedestrian region may not be limited to the examples described herein, and other object detection or recognition technologies used by one of ordinary skill in the art may be used. For example, a deep learning-based object detection or recognition technology may be used. The processor may detect, as the pedestrian, a person identified through such an object detection technology.

In operation 502, the processor may determine a static point in the detected pedestrian region. The processor may determine, to be the static point, a point corresponding to a position of a stepping foot of the pedestrian in a joint region. The processor may determine, to be the static point, a point at which a height is lowest in the joint region.

The processor may extract the joint region from the pedestrian region and determine a point nearest to the ground in the joint region to be the static point corresponding to the stepping foot of the pedestrian. Even when the pedestrian stops moving, the processor may determine a point nearest to the ground in the joint region to be the static point corresponding to the stepping foot of the pedestrian.

In operation 503, the processor may determine a distance between the pedestrian and the camera based on the static point in each of the images and a position of the camera corresponding to each of the images. The processor may calculate the distance between the pedestrian and the camera based on a difference between 3D points determined by a vector including the static point in each of the images and a point corresponding to each position of the camera.

An SFM may be used to calculate the distance between the pedestrian and the camera. For example, a 3D point may be determined by the vector including the static point in each of the images and the point corresponding to each position of the camera. 3D coordinates may be determined for the static point based on the difference between the 3D points determined in each of the images.

The estimating apparatuses, processors, cameras, estimating apparatus 101, processor 102, camera 104, camera 201 through 203, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with distance estimation, the method comprising:
   detecting a pedestrian region of a pedestrian comprised in a plurality of images obtained from a camera at different positions;
   determining a static point in the detected pedestrian region, including extracting a plurality of joint regions of the pedestrian from the pedestrian region and determining the static point of the pedestrian based on the extracted joint regions;
   determining 3D (Three-dimensional) points based on a vector associated with the extracted joint regions and determining 3D coordinates of each of the extracted joint regions; and
   determining a distance between the pedestrian and the camera, using the 3D points and the 3D coordinates, based on a difference between the static point in each of the images and the different positions of the camera corresponding to each of the images.

2. The method of claim 1, wherein the static point corresponds to a position of a stepping foot of the pedestrian.

3. The method of claim 1, wherein the determining of the static point comprises:
determining, to be the static point, a point corresponding to a position of a stepping foot of the pedestrian in the joint region.

4. The method of claim 1, wherein the determining of the static point comprises:
determining, to be the static point, a point at which a height is lowest in the joint regions.

5. The method of claim 1, wherein the determining of the distance between the pedestrian and the camera comprises:
determining the distance between the pedestrian and the camera based on a difference between three-dimensional (3D) points determined by a vector comprising the static point in each of the images and a point corresponding to a position of the different positions of the camera.

6. A non-transitory computer-readable storage medium storing instructions that, when executed by a processor, configure the processor to perform the method of claim 1.

7. An apparatus with distance estimation, the apparatus comprising:
a processor configured to:
detect a pedestrian region of a pedestrian comprised in a plurality of images obtained from a camera at different positions;
determine a static point in the detected pedestrian region, including extracting a plurality of joint regions of the pedestrian from the pedestrian region and determining the static point of the pedestrian based on the extracted joint regions;
determine 3D (Three-dimensional) points based on a vector associated with the extracted joint regions, and determine 3D coordinates of each of the extracted joint regions; and
determine a distance between the pedestrian and the camera, using the 3D points and the 3D coordinates, based on a difference between the static point in each of the images and the different positions of the camera corresponding to each of the images.

8. The apparatus of claim 7, wherein the static point corresponds to a position of a stepping foot of the pedestrian.

9. The apparatus of claim 7, wherein, for the determining of the static point, the processor is configured to:
determine, to be the static point, a point corresponding to a position of a stepping foot of the pedestrian in the joint regions.

10. The apparatus of claim 7, wherein, for the determining of the static point, the processor is configured to:
determine, to be the static point, a point at which a height is lowest in the joint regions.

11. The apparatus of claim 7, wherein, for the determining of the distance between the pedestrian and the camera, the processor is configured to:
determine the distance between the pedestrian and the camera based on a difference between three-dimensional (3D) points determined by a vector comprising the static point in each of the images and a point corresponding to a position of the different positions of the camera.

12. The apparatus of claim 7, further comprising the camera, wherein the camera is configured to collect the images.

13. A method with distance estimation, the method comprising:
determining a static point of a target in each of images obtained by a camera at different positions, including extracting a plurality of joint regions of the target from a target region, included in each of the images, and determining the static point of the target based on the extracted joint regions;
determining 3D (Three-dimensional) points based on a vector associated with the extracted joint regions and determining 3D coordinates of each of the extracted joint regions; and
determining a distance between the target and the camera, using the 3D points and the 3D coordinates, based on the static point in each of the images and the different positions of the camera.

14. The method of claim 13, wherein, for each of the images, the determining of the static point comprises determining, to be the static point, a lowest point among points in the joint regions.

15. The method of claim 13, wherein
the camera obtains the images at the different positions by a movement of the camera, and
the determining of the distance between the target and the camera comprises:
determining a structure from motion (SFM) based on the static point in each of the images and the different positions corresponding to the images; and
determining the distance based on the SFM.

* * * * *